(12) United States Patent
Chang

(10) Patent No.: US 11,477,757 B2
(45) Date of Patent: Oct. 18, 2022

(54) METHOD FOR POSITIONING PORTABLE DEVICES INDOORS WITHIN A MESH-TYPE WIRELESS NETWORK AND SYSTEM EMPLOYING METHOD

(71) Applicant: CyberTAN Technology, Inc., Hsinchu (TW)

(72) Inventor: Chien-Mu Chang, Hsinchu (TW)

(73) Assignee: CyberTAN Technology, Inc., Hsinchu (TW)

( * ) Notice: Subject to any disclaimer, the term of this patent is extended or adjusted under 35 U.S.C. 154(b) by 20 days.

(21) Appl. No.: 17/181,185

(22) Filed: Feb. 22, 2021

(65) Prior Publication Data
US 2022/0272656 A1   Aug. 25, 2022

(51) Int. Cl.
| | |
|---|---|
| *H04W 64/00* | (2009.01) |
| *H04W 4/029* | (2018.01) |
| *H04W 4/021* | (2018.01) |
| *H04W 4/33* | (2018.01) |
| *H04B 17/318* | (2015.01) |

(52) U.S. Cl.
CPC ........ *H04W 64/003* (2013.01); *H04B 17/318* (2015.01); *H04W 4/021* (2013.01); *H04W 4/029* (2018.02); *H04W 4/33* (2018.02)

(58) Field of Classification Search
CPC ....... G01S 5/14; H04W 64/00; H04W 64/003; H04W 4/029
See application file for complete search history.

(56) References Cited

U.S. PATENT DOCUMENTS

| | | | |
|---|---|---|---|
| 2020/0092776 A1* | 3/2020 | Edge | H04W 36/08 |
| 2022/0110085 A1* | 4/2022 | Khoryaev | H04W 64/003 |

FOREIGN PATENT DOCUMENTS

| | | |
|---|---|---|
| CN | 106211079 A | 12/2016 |
| CN | 104655137 B | 7/2017 |

* cited by examiner

*Primary Examiner* — Kevin Kim
(74) *Attorney, Agent, or Firm* — ScienBiziP, P.C.

(57) ABSTRACT

A method and a system for indoor positioning within a wireless mesh-type network can be applied where a plurality of access points are located in an indoor space. According to the method, any one access point of the plurality of access points receives a request for indoor positioning transmitted by a portable device, wherein the request comprises received signal strength indications (RSSIs) measured and collected by the portable device. The access point compares the measured and collected RSSIs of the request to RSSIs stored in a fingerprinting database to determine a fingerprinting position using a closest match method and the access point provides, to the portable device, the determined fingerprinting position.

8 Claims, 3 Drawing Sheets

METHOD FOR POSITIONING PORTABLE DEVICES INDOORS WITHIN A MESH-TYPE WIRELESS NETWORK AND SYSTEM EMPLOYING METHOD

FIELD

The subject matter herein generally relates to wireless communications, and optimal positioning of wireless devices therein.

BACKGROUND

Fingerprinting can be used for indoor positioning of devices within a wireless network. However, this technique requires collecting received signal strength indicators (RSSIs) at a higher granularity level in order to improve the positioning accuracy. Providing the users with an accurate, real-time, and robust location estimation is problematic.

BRIEF DESCRIPTION OF THE DRAWINGS

Implementations of the present technology will now be described, by way of embodiment, with reference to the attached figures, wherein.

DETAILED DESCRIPTION

Figure 1:
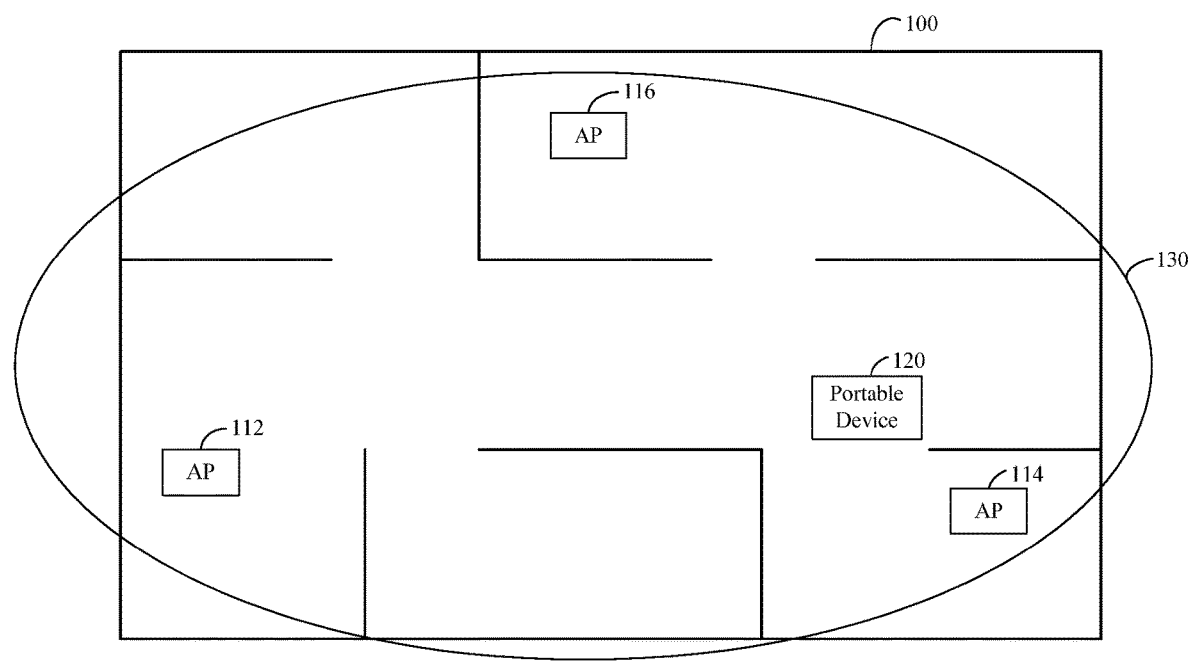
FIG. 1 is a block diagram of one embodiment of an indoor positioning system within a wireless network.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates an indoor positioning system using multiple access points to determine an indoor position of at least one portable device within any wireless environment (environment 100). The indoor positioning system comprises multiple access points (APs), namely 112, 114, 116, and at least one portable device 120. The environment 100 illustrated in FIG. 1 is of a home setting. It is understood that the system may be implemented in other environment, such as a factory, hospital, school, or the like. As shown, multiple APs 112, 114, 116 are deployed in the environment 100. The APs 112, 114, and 116 each support wireless communication with the portable device 120 carried by a user. In the embodiment, the multiple APs 112, 114, 116 form a mesh network 130, and the multiple APs joined together provide connection services for one or more portable devices. It is understood that although there are only three APs herein, the number of APs used is not limited thereto.

In one embodiment, the portable device 120 comprises a smart mobile phone, tablet, smart watch, and any other portable communication devices capable of running applications.

In one embodiment, the method for indoor positioning comprises two phases, a learning phase and a positioning phase.

In one embodiment, the learning phase collects fingerprinting data for the environment 100. The APs of the indoor positioning system may all, potentially, collect and share the fingerprinting database. The learning phase may be initiated in response to a number of automated or manual procedures. The learning phase may also be initiated in response to a command, instruction, or signal received from the portable device 120.

In one embodiment, an indoor positioning application downloaded, installed, and stored in a memory of the portable device 120 may render a digital map of the environment 100 through a display of the portable device 120. The digital map comprises a map of the indoor space of the environment 100, and respective locations of the APs 112, 114, and 116. In one embodiment, in order to automatically download the digital map from a server, the portable device 120 can use alternative techniques, for example, GPS, for resolving its own geo-location information and use the resolved geo-location information to download the appropriate digital map.

Figure 2:
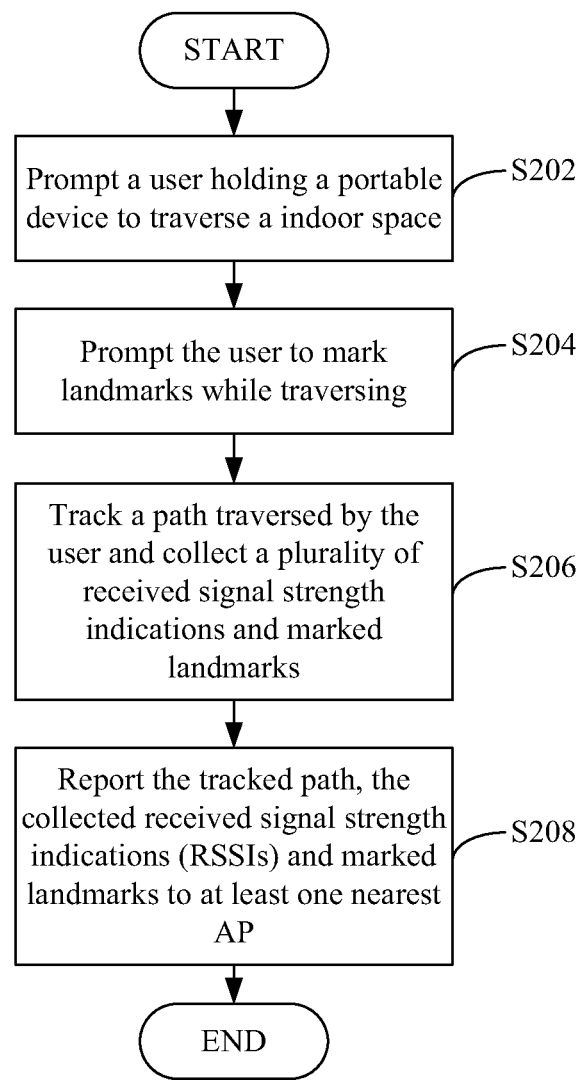
FIG. 2 is a flow chart of one embodiment of a process for a learning phase in the system.

FIG. 2 illustrates a flow chart of a process for the learning phase. In one embodiment, the process of FIG. 2 may be implemented by the indoor positioning application executed by the portable device 120. In one embodiment, the learning phase may be initiated in response to a user-specified action with the indoor positioning application.

Step S202, the indoor positioning application prompts the user of the portable device 120 to traverse the indoor space by utilizing the digital map.

Step S204, the indoor positioning application prompts the user to mark landmarks through a graphical user interface while traversing.

Step S206, the indoor positioning application tracks a path traversed by the user and obtains received signal strength indications and marked landmarks collected by the portable device 120 while traversing.

In one embodiment, the path is tracked by sensors of the portable device 120. In one embodiment, the sensors comprise accelerometers, gyroscopes, compass, magnetometer, and others in order to monitor the distance, speed, and/or trajectory of the user when traversing.

Step S208, the indoor positioning application reports the tracked path, the collected received signal strength indications (RSSIs), and the marked landmarks to at least one nearest AP.

In one embodiment, the at least one nearest AP decomposes the tracked path and the marked landmarks into a set of fingerprinting positions, and determines a correlation between the collected RSSIs and the set of fingerprinting positions to maintain a fingerprinting database. In one embodiment, the fingerprinting database comprises entries indexed by the fingerprinting positions, and a set of RSSIs associated with each one of the fingerprinting positions.

In one embodiment, RSSI-to-distance correspondences are pre-stored in each one of the APs, the RSSIs associated with a non-traversed fingerprinting position can be estimated by interpolation or by extrapolation based on the received tracked path, the received RSSIs, and the pre-stored RSSI-to-distance correspondences.

The learning phase may be a continuous or an ongoing phase, meaning that even when the positioning phase is performed, the fingerprinting database can be updated with new reports from the portable device 120 or from other portable devices.

Figure 3:
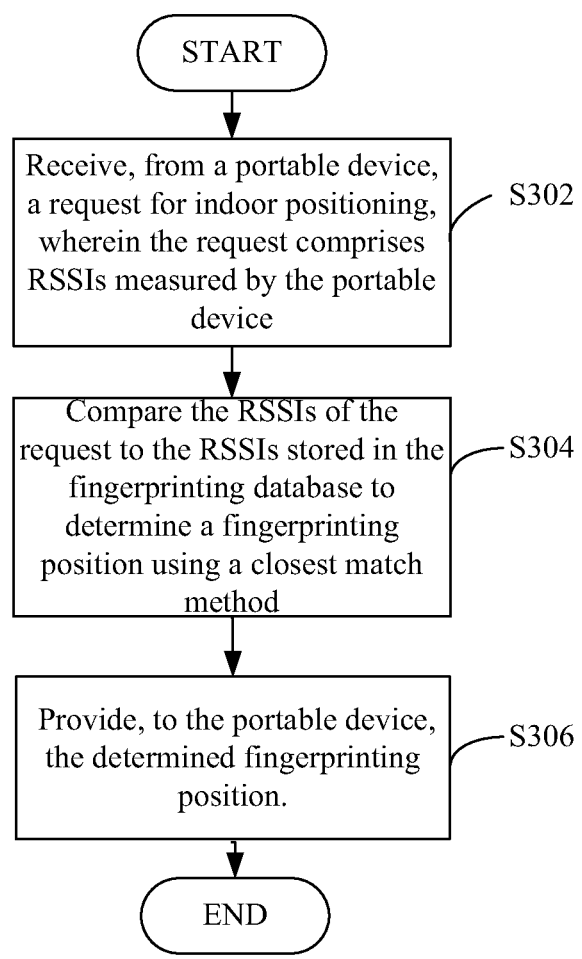
FIG. 3 is a flow chart of one embodiment of a process for a positioning phase in the system.

FIG. 3 illustrates a flow chart of a process for the positioning phase. The process for the positioning phase described herein enables a user of the portable device 120 to determine his or her position in the indoor space. The process can be completed by any one of the APs and the portable device 120. In one embodiment, the portable device 120 receives a user request for indoor positioning through the indoor positioning application installed on the portable device, and the following steps are then performed by the APs.

Step S302, an AP receives, from the portable device 120, a request for indoor positioning, wherein the request comprises RSSIs measured by the portable device 120.

In the embodiment, the request is received by any AP including the AP which is nearest to the portable device.

Step S304, the AP compares the RSSIs of the request to the RSSIs stored in the fingerprinting database to determine a fingerprinting position, using a closest match method.

Step 306, the AP provides to the portable device, the determined fingerprinting position.

The method and the system for indoor positioning can detect a location of a portable device in a mesh-type network, and provide immediate location based services for a user of the portable device even when the user is in an indoor space. The applications installed on the portable device can also provide location based services once the indoor position of the portable device is obtained.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for positioning indoors within a mesh-type network comprising a plurality of access points located in an indoor space, the method comprising:
    receiving, by an access point of the plurality of access points, a request for indoor positioning request transmitted by a portable device, wherein the request comprises received signal strength indications (RSSIs) measured by the portable device;
    comparing, by the access point, the measured RSSIs of the request to RSSIs stored in a fingerprinting database to determine a fingerprinting position using a closet match method, wherein the fingerprinting database is maintained by the steps of:
    prompting, by an application installed in a memory of the portable device, a user holding the portable device to traverse the indoor space by utilizing a digital map of the indoor space;
    prompting, by the application, the user to mark landmarks through a graphical user interface while traversing;
    tracking, by the application, a path traversed by the user;
    collecting, by the application, a plurality of RSSIs and marked landmarks while traversing; and
    reporting, by the application, the tracked path, the collected RSSIs, and the marked landmarks to at least one nearest access point of the plurality of access points; and
    providing, by the access point, the determined fingerprinting position to the portable device.

2. The method of claim 1, wherein the fingerprinting database comprises entries indexed by a plurality of fingerprinting positions, and a set of RSSIs associated with each one of the plurality of fingerprinting positions.

3. The method of claim 1, wherein the fingerprinting database is further maintained by the steps of:
    decomposing, by the at least one nearest access point, the tracked path and the marked landmarks into a set of fingerprinting positions; and
    determining, by the at least one nearest access point, a correlation between the collected RSSIs and the set of fingerprinting positions to maintain the fingerprinting database.

4. The method of claim 1, wherein the method further comprises:
    estimating, by the at least one nearest access point, a set of RSSIs associated with a non-traversed fingerprinting position based on the tracked path, the collected RSSs, and pre-stored RSSI-to-distance correspondences.

5. A system for positioning indoors within a mesh-type network, the system comprising:
    a plurality of access points, and each one of the plurality of access points configured to:
    receive a request for indoor positioning request transmitted by a portable device, wherein the request comprises received signal strength indications (RSSIs) measured by the portable device;
    compare the measured RSSIs of the request to RSSIs stored in a fingerprinting database to determine a fingerprinting position using a closet match method, wherein the fingerprinting database is maintained by each one of the plurality of access points to utilize an application installed on the portable device to execute the steps of:
    prompting a user holding the portable device to traverse the indoor space by utilizing a digital map of the indoor space;
    prompting the user to mark landmarks through a graphical user interface while traversing;

tracking a path traversed by the user;
collecting a plurality of RSSIs and marked landmarks while traversing; and
reporting the tracked path, the collected RSSIs, and the marked landmarks to at least one nearest access point of the plurality of access points; and
provide the determined fingerprinting positon to the portable device with the determined fingerprinting position.

6. The system of claim 5, wherein the fingerprinting database comprises entries indexed by a plurality of fingerprinting positions, and a set of RSSIs associated with each one of the plurality of fingerprinting positions.

7. The system of claim 5, wherein the at least one nearest access point is operable to:
decompose the tracked path and the marked landmarks into a set of fingerprinting positions; and
determine a correlation between the collected RSSIs and the set of fingerprinting positions to maintain the fingerprinting database.

8. The system of claim 7, wherein the at least one nearest access point is further operable to:
estimating a set of RSSIs associated with a non-traversed fingerprinting position based on the tracked path, the collected RSSs, and pre-stored RSSI-to-distance correspondences.

* * * * *